March 15, 1960   J. O. HELVERN ET AL   2,928,511
FLUID PRESSURE CONTROL OF CIRCULATING FLUID IN A BRAKE
Filed Nov. 21, 1955   2 Sheets-Sheet 1
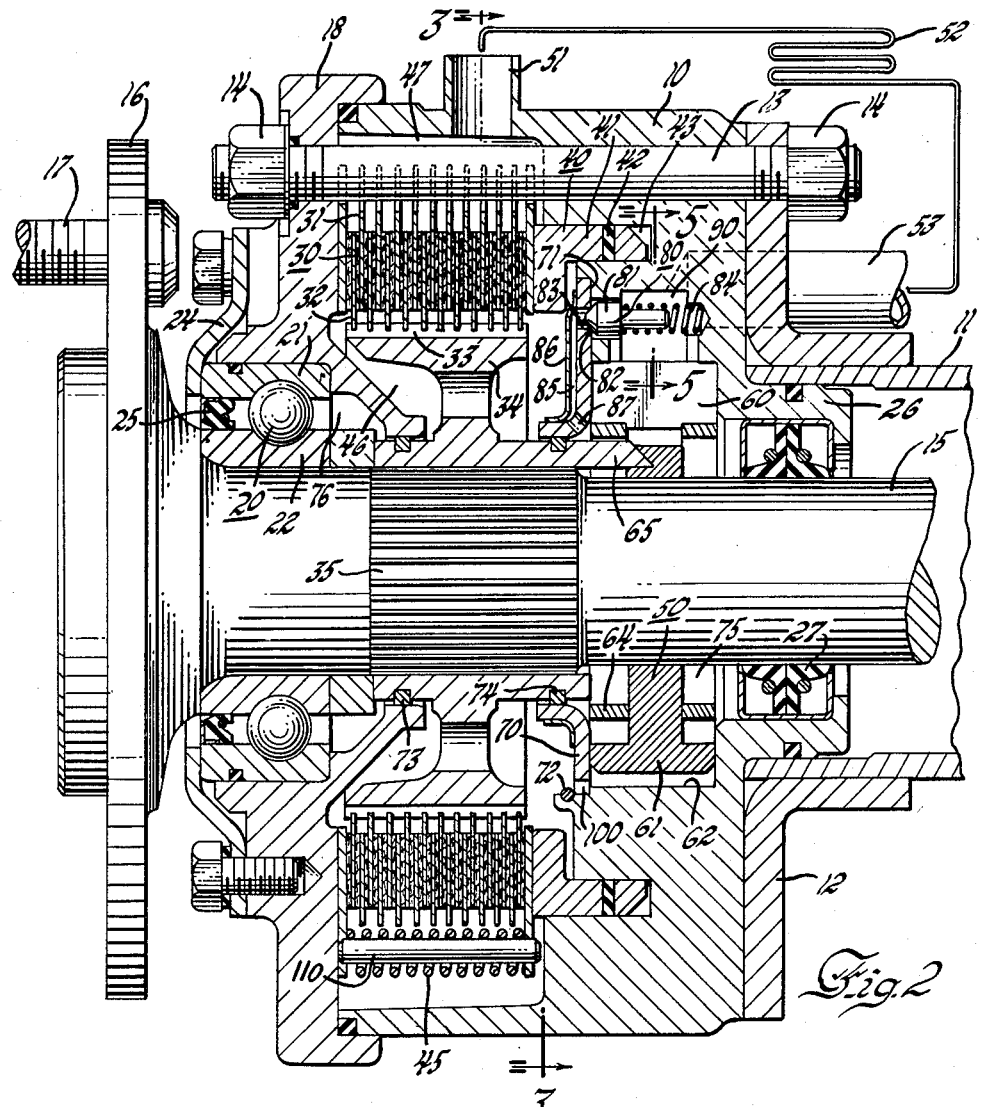
INVENTOR.
James O. Helvern &
BY William F. Erickson
Craig V. Morton
HIS ATTORNEY INVENTOR.
James O. Helvern &
BY William F. Erickson
Craig V. Morton
HIS ATTORNEY

United States Patent Office 2,928,511
Patented Mar. 15, 1960

2,928,511

FLUID PRESSURE CONTROL OF CIRCULATING FLUID IN A BRAKE

James O. Helvern, Lewisburg, and William F. Erickson, Dayton, Ohio, assignors to General Motors Corporation, Detroit, Mich., a corporation of Delaware Application November 21, 1955, Serial No. 548,102

5 Claims. (Cl. 188—264)

This invention relates to friction brakes adapted for circulation of fluid under pressure through the brake to effect cooling of the brake.

An object of the invention is to provide a friction brake with a pressure fluid circulating system in which the fluid is continuously circulated at all times through the brake whenever the vehicle on which the brake is used is in motion and in which there is provided valve means responsive to fluid pressure within the brake to open the valve and relieve fluid pressure within the brake directly into the low pressure side of the pump that circulates the fluid whenever the fluid pressure within the brake exceeds a predetermined maximum pressure. The arrangement is such as to prevent excessive pressures being developed within the circulating system for the brake during extremely high speed operation of the vehicle on which the brake is used.

Another object of the invention is to provide a friction brake adapted to have a pressure fluid circulating through the brake to effect cooling wherein there is provided a pump to effect the fluid circulation and seals are provided between the shaft supporting the brake and the brake housing to prevent loss of fluid from within the brake, a valve being provided in the brake to relieve fluid pressure immediately adjacent the seals whereby to maintain a predetermined positive fluid pressure on the seals. The relieved fluid pressure is delivered from immediately adjacent the seals into the low pressure side of the pump that circulates the cooling fluid through the brake.

Further objects and advantages of the present invention will be apparent from the following description, reference being had to the accompanying drawings wherein a preferred form of the invention is clearly shown.

In the drawings:

Figure 1 is a side elevational view of a brake incorporating features of the invention.

Figure 2 is a transverse cross sectional view taken substantially along line 2—2 of Figure 1.

Figure 3:
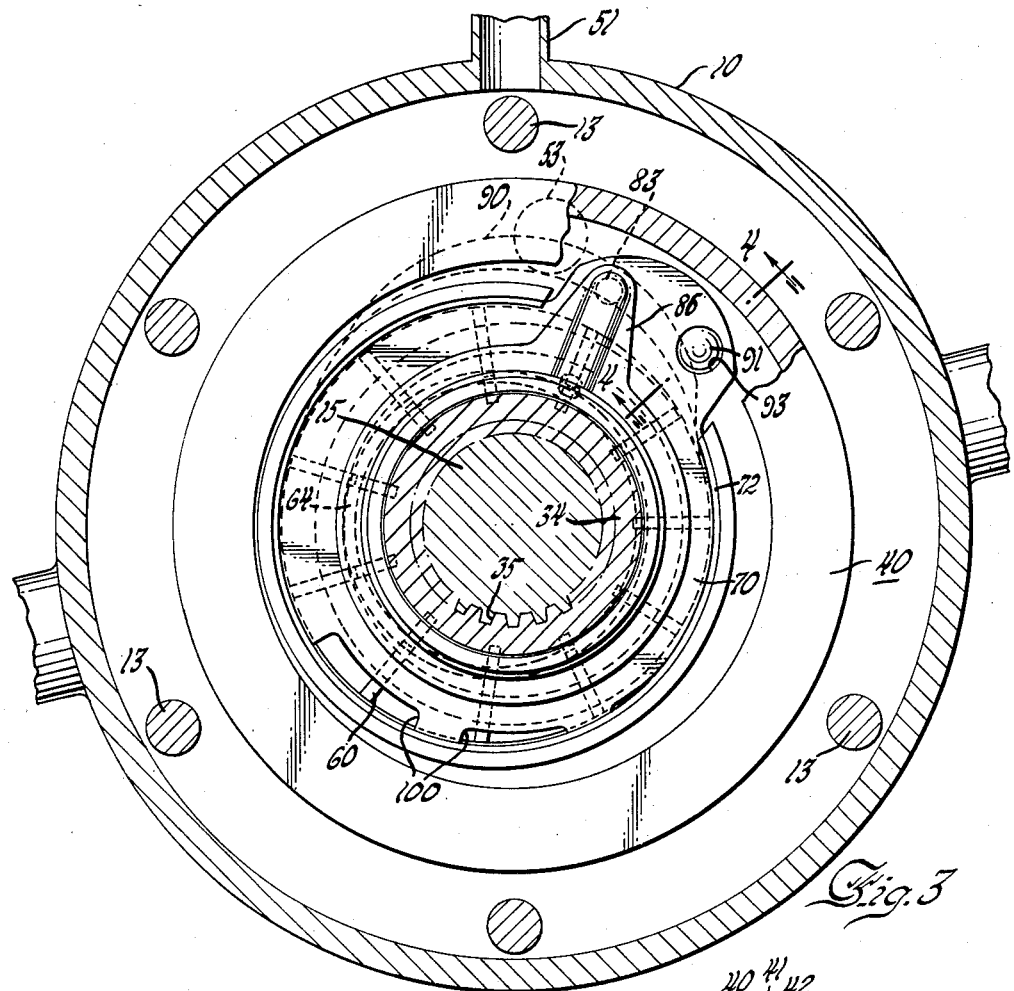
Figure 3 is a cross sectional view taken along line 3—3 of Figure 2.
Figure 5:
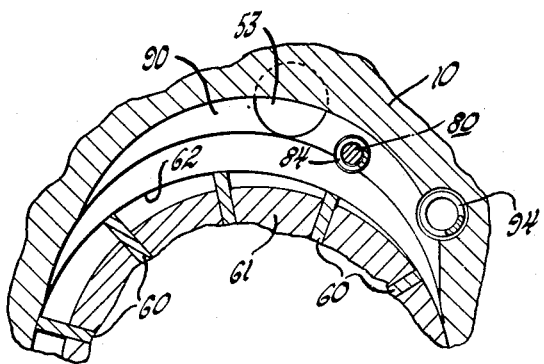
Figure 5 is a partial cross sectional view taken along line 5—5 of Figure 2.

In this invention the friction brake includes a housing 10 that is carried on the axle housing 11 that extends from the differential housing of a motor vehicle. The axle housing 11 carries a radially extending supporting flange 12 to which the housing 10 is attached by the through bolts 13 and the nuts 14.

The axle housing 11 encloses a drive axle 15 that extends through the brake housing 10 and has a radial flange 16 to which a wheel disk is adapted to be supported by means of the studs 17.

The brake housing 10 has a cover plate 18 that closes one end of the housing. The cover plate 18 supports an anti-friction bearing 20 that has the outer race 21 supported in the cover plate 18 and the inner race 22 that supports the drive axle 15. A retaining plate 24 holds the anti-friction bearing 20 in place in the cover plate 18. A seal member 25 is positioned between the inner and outer races 22, 21 of the anti-friction bearing 20 to prevent loss of fluid from the brake housing 10 through the anti-friction bearing 20.

The housing 10 carries an axial projection 26 that is disposed within the inner periphery of the axle housing 11 and supports a seal 27 between the housing 10 and the drive axle 15 to prevent loss of fluid from within the housing 10 along the shaft 15.

The brake housing 10 encloses a multiple disk friction brake 30 that includes a plurality of stationary disks 31 interposed between rotating disks 32. The stationary disks 31 are prevented from rotation by engagement with the through bolts 13.

The rotating disks 32 have their internal periphery splined to fit upon the spline 33 carried on the hub 34 that in turn is non-rotatively carried on the drive axle 15 on the spline 35. Thus the rotating disks 32 and the stationary disks 31 form a disk assemblage by which a brake operation is effected when the disks of the assemblage are brought into frictional engagement.

The brake disk assemblage 30 is moved axially of the drive axle 15 by means of an annular piston 40 that has an annular extension 41 slidable in an annular groove 42. The groove 42 provides a chamber 43 adapted to receive hydraulic fluid from a master cylinder (not shown) of a motor vehicle that is operated manually by means of a conventional brake pedal on the vehicle. Delivery of fluid into the chamber 43 from the master cylinder effects axial movement of annular piston 40 to apply pressure to the disk assemblage 31, 32 and thereby create a brake action.

A plurality of compression springs 45 are carried upon a plurality of studs 110 to effect axial expansion of the disk assemblage 30 when hydraulic pressure is removed from the fluid in the cylinder space 43, whereby the disk assemblage 30 is normally retained in a disengaged condition.

The brake disk assemblage 30 divides the internal chamber of the brake housing 10 into an internal chamber 46 and an external chamber 47. Fluid under pressure is delivered into the internal chamber 46 from a fluid pump 50 for circulation between the disks of the assemblage 30. The fluid circulated through the disk assemblage 30 is discharged through the outlet port 51 for delivery to a heat exchange device 52 and then returned to the inlet conduit 53 for the fluid pump 50, whereby the pump 50 provides for circulation of liquid under pressure into the chamber 46 and through the disk assemblage 30 and through the heat exchange device 52 continuously so long as the pump 50 is driven by the drive axle 15.

The fluid pump 50 is of the vane type and includes a plurality of vanes 60 carried in a rotor 61 that rotates in a pump chamber 62 provided in the brake housing 10. The pump vanes 60 are retained in their outer position against the periphery of the pump chamber 62 by means of annular rings 64. The rotor 61 is keyed to the hub 34 by one or more lugs 65 whereby the pump vanes 60 rotate within the pump chamber 62 whenever the drive axle 15 is rotated to cause the pump 50 to circulate fluid in the manner heretofore described whenever the axle 15 rotates.

The pump chamber 62 is closed by a radially extending wall 70 that forms a common wall between the pump chamber 62 and the pressure chamber 46 internally of the brake disk assemblage 30. The wall 70 is retained in position in a recess 71 by means of a snap ring 72.

To reduce flow of pressure fluid from the pressure chamber 46, a metal ring seal 73 is provided between the hub 34 and the cover plate 18. A similar metal ring seal 74 is provided between the hub 34 and the wall 70. However, there is some leakage of fluid past the ring seals 73 and 74 into the internal cavity 75 of the pump 50 and into the cavity 76 adjacent the anti-friction bearing 20. The cavities 76 and 75 are interconnected through the clearances in the spline 35 so that the same fluid pressure is present in the cavity 76 as that in the cavity 75.

To prevent the fluid pressure in the cavities 76 and 75 rising to a high value and thereby impressing a high fluid pressure on the seals 25 and 27, a pressure operated valve 80 is adapted to open when pressure in the cavity 75 reaches a predetermined value.

The valve 80 comprises a valve member 81 that engages a valve seat 82 formed by the periphery of an opening 83 in the wall 70. A compression spring 84 positioned between the valve member 81 and the housing 10 normally retains the valve member 81 on the valve seat 82 to close the port opening 83.

The valve 80 is positioned in the suction inlet chamber 90 provided on the suction or low pressure side of the pump 50, and with which the inlet conduit or line 53 communicates for return of fluid to the inlet side of the pump 50 from the heat exchange device 52.

The port 83 in the wall 70 communicates with a passage 85 formed by a plate 86 secured to the wall 70 in any suitable manner, such as brazing or welding. The passage 85 in turn communicates with an opening 87 in the wall 70 that communicates with the chamber 75 internally of the pump 50 and through the clearances in the spline 35 that communicates with the chamber 76 adjacent the anti-friction bearing 20.

Thus, when pressure fluid seeping past the seals 73 and 74 creates a pressure in the chamber 75 above a predetermined value, the valve element 81 will be lifted from its seat 82 to allow pressure fluid to be relieved from the chamber 75 through the passages 87 and 85 and the port 83 into the inlet or suction chamber 90 of the pump 50. Thus the fluid pressure in the chambers 75 and 76, is maintained at a maximum predetermined positive fluid pressure so that the seals 27, 25 will not be under the influence of fluid pressures more than that of a fixed value pressure.

Figure 4:
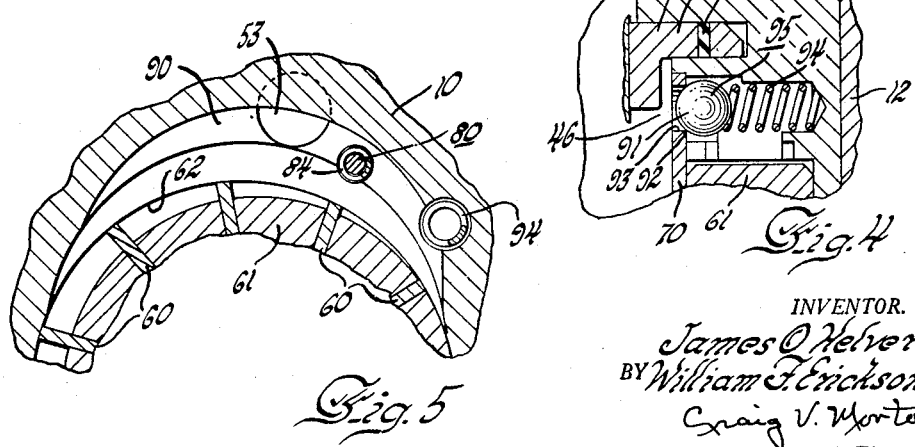
Figure 4 is a partial cross sectional view taken along line 4—4 of Figure 3.

A second valve 95 is provided in the inlet chamber 90 for the pump 50 (see Figure 4). The valve 95 includes a ball valve member 91 that fits upon a valve seat 92 formed by the periphery of an opening 93 provided in the pump wall 70. A compression spring 94 retains the ball valve 91 on its seat. The port 93 communicates directly with the pressure chamber 46 internally of the brake disk assemblage 30. Thus when fluid pressure delivered by the pump 50 through the discharge passages 100 in the pump wall 70 into the pressure chamber 46 reaches a predetermined value, the ball valve element 91 will be lifted from its seat 92 to allow excess fluid to be discharged from the pressure chamber 46 directly into the pump inlet chamber 90 and thereby prevent any further rise of fluid pressure within the pump chamber 46 and thus in the fluid circulating system including the heat exchange device 52. The pump 50 can thus circulate fluid continuously through the fluid circulating system including the heat exchange device so long as the fluid pressure in the system remains below a predetermined value. However, when the fluid pressure rises above the pressure of predetermined value, fluid will be by-passed through the valve 95 into the inlet side of the pump 50 and reduce the volume of fluid circulated in the system proportionately.

While the form of embodiment of the invention as herein disclosed constitutes a preferred form, it is to be understood that other forms might be adopted as may come within the scope of the claims which follow.

What is claimed is as follows:

1. In a friction brake, the combination of, a brake housing, a rotatable shaft extending through said housing, friction brake means within said housing having stationary elements connected with said housing and rotatable elements connected with said shaft with said housing having a wall dividing said housing into two chambers, pump means in said housing in one of said chambers and drivingly connected with said shaft for operation of the pump means, said one wall of the pump chamber common with and forming one wall of said other chamber of said housing thereby separating the pump means from the other chamber which contains the brake means, valve means controlling an opening in said common wall leading into the low pressure side of said pump means and opened by fluid pressure in said brake chamber above a predetermined value for delivery of fluid from the said brake chamber into the low pressure side of the pump means, seal means between said shaft and said housing and defining opposite ends of a seal chamber around said shaft, said seal chamber receiving leakage high pressure fluid from said other chamber from around one of said seal means, said brake means and said pump means forming the radially outer portion of the wall of said seal chamber, and a second valve means controlling an opening in said common wall leading into the low pressure side of said pump means opened by pressure fluid above a predetermined value in said seal chamber to provide for delivery of fluid from immediately adjacent the seal means to the low pressure side of the pump means to avoid more than a maximum positive fluid pressure on the seal means.

2. Apparatus in accordance with claim 1 in which both of said valve means are positioned within the inlet side of said pump means.

3. In a friction brake, the combination of, a brake housing, a rotatable shaft extending through said housing, friction brake means within said housing having stationary elements connected with said housing and rotatable elements connected with said shaft with said housing having a wall dividing said housing into two chambers, pump means in said housing in one of said chambers and drivingly connected with said shaft for operation of the pump means, said pump means having one wall of the pump chamber common with and forming one wall of the other chamber of said housing thereby separating the pumping means from said other chamber which contains the braking means, valve means controlling an inlet to the low pressure side of said pumping means and opened by fluid pressure in said brake means chamber above a predetermined value to provide for delivery of fluid from said brake means chamber into the low pressure side of said pumping means, said brake means chamber having a spline sleeve connected to said shaft, said spline sleeve having a seal means sealing said brake means chamber from said shaft, a second sealing means disposed between said housing and said shaft at opposite ends of said housing member, cavity means contained within said housing adjacent to said second seal means, a rotor member mounted within said pumping chamber, said cavity means adjacent to said second seal means internally connected by means of said internal portion of said spline sleeve and said rotor member of said pumping means thereby providing a continuous chamber between said second sealing means, said sealing chamber connected by a conduit means to a valve means controlling a port in communication with the low side of said pumping means thereby providing a predetermined pressure on said second sealing means.

4. In a friction brake the combination of, a brake housing containing friction brake means, pump means effecting delivery of fluid under pressure into said housing and thereby circulation of fluid through the brake means, a wall separating said brake means from said pump means, a shaft extending through said housing supporting at least a part of the friction brake means, seal means between said shaft and said housing at opposite ends of said housing and disposed within a seal chamber to prevent pressure fluid flow from said housing, said housing having cavity means adjacent to said sealing means and internal of said housing, a second seal means internal of and adjacent to said cavity means sealing said brake means from said cavity means, said first and said second seal means adjacent said cavity means being under the influence of pressure fluid in said housing, a pair of independently acting valve means mounted on said wall, one of which is opened by fluid pressure in said brake means above a predetermined value to effect delivery of fluid from said brake means into the low pressure side of the pump means to relieve pressure in the brake means and the other of which is opened by fluid pressure above a predetermined value adjacent said first and said second seal means in said cavity means to effect delivery of fluid adjacent said first and said second seal means to the low pressure side of said pump means.

5. In a friction brake the combination of, a brake housing containing friction brake means, pump means effecting delivery of fluid under pressure into said housing and thereby circulation of fluid through the friction brake means, a wall separating said brake means from said pump means, a shaft extending through said housing connected to the rotating portion of said brake means, seal means between said shaft and housing at opposite ends of said housing, said housing containing a cavity means adjacent said seal means, a second seal means adjacent to and internal of said cavity means and sealing said brake means from said cavity means, said cavity means receiving leakage of high pressure fluid from said brake means, a pair of independently acting valve means mounted in said wall one of which is open by fluid pressure in said brake means above a predetermined value to effect delivery of fluid from said brake means into the low pressure side of said pump means to relieve fluid pressure in the brake means and the other of which is opened by fluid pressure above a predetermined value in said cavity means to effect delivery of fluid from said cavity means adjacent said first and said second seal means to the low pressure side of said pump means.

References Cited in the file of this patent

UNITED STATES PATENTS

| | | |
|---|---|---|
| 1,174,678 | Carpenter et al. | Mar. 7, 1916 |
| 2,148,818 | Kattwinkel | Feb. 28, 1939 |
| 2,175,868 | Bentley | Oct. 10, 1939 |
| 2,369,249 | Rainalter | Feb. 13, 1945 |
| 2,471,858 | Bloomfield | May 31, 1949 |
| 2,625,108 | Logan | Jan. 13, 1953 |
| 2,835,357 | Kelley et al. | May 20, 1958 |